US007887407B1

(12) United States Patent
Singer et al.

(10) Patent No.: US 7,887,407 B1
(45) **Date of Patent: *Feb. 15, 2011**

(54) METHOD OF EXTENDING PLAY OF A SLOT MACHINE GAME

(75) Inventors: Anthony Mark Singer, Ringwood, NJ (US); Howard Mitchell Marks, Scardale, NY (US)

(73) Assignee: PTT, LLC., Mahwah, NJ (US)

( * ) Notice: Subject to any disclaimer, the term of this patent is extended or adjusted under 35 U.S.C. 154(b) by 766 days.

This patent is subject to a terminal disclaimer.

(21) Appl. No.: 11/397,197

(22) Filed: Apr. 4, 2006

Related U.S. Application Data

(63) Continuation-in-part of application No. 10/438,325, filed on May 15, 2003, now Pat. No. 7,278,914, which is a continuation-in-part of application No. 09/939,787, filed on Aug. 28, 2001, now Pat. No. 6,960,133, said application No. 10/438,325 is a continuation-in-part of application No. 10/105,942, filed on Mar. 26, 2002, now Pat. No. 6,935,947, which is a continuation-in-part of application No. 09/432,602, filed on Nov. 3, 1999, now abandoned, which is a continuation-in-part of application No. 09/234,098, filed on Jan. 19, 1999, now Pat. No. 6,371,851, which is a continuation of application No. PCT/US98/10373, filed on May 21, 1998, said application No. 10/438,325 is a continuation-in-part of application No. 09/613,727, filed on Jul. 11, 2000, now Pat. No. 6,604,998.

(60) Provisional application No. 60/228,472, filed on Aug. 28, 2000, provisional application No. 60/047,493, filed on May 23, 1997, provisional application No. 60/289,633, filed on May 9, 2001, provisional application No. 60/164,583, filed on Nov. 10, 1999, provisional application No. 60/380,485, filed on May 15, 2002, provisional application No. 60/412,012, filed on Sep. 20, 2002, provisional application No. 60/445,769, filed on Feb. 10, 2003.

(51) Int. Cl.
*A63F 13/00* (2006.01)

(52) U.S. Cl. ............................ 463/19; 463/10; 463/11; 463/16; 463/20

(58) Field of Classification Search .................. 463/16, 463/30–33, 17, 1, 6, 18–20, 40–42
See application file for complete search history.

(56) References Cited

U.S. PATENT DOCUMENTS

| | | | | |
|---|---|---|---|---|
| 5,769,716 | A * | 6/1998 | Saffari et al. | 463/20 |
| 6,371,851 | B1 | 4/2002 | Singer et al. | |
| 6,641,477 | B1 * | 11/2003 | Dietz, II | 463/20 |
| 6,910,962 | B2 | 6/2005 | Marks et al. | |
| 7,144,322 | B2 * | 12/2006 | Gomez et al. | 463/20 |
| 2006/0068876 | A1 * | 3/2006 | Kane et al. | 463/16 |

* cited by examiner

*Primary Examiner*—Ronald Laneau
*Assistant Examiner*—Ross A. Williams

(57) ABSTRACT

The present invention extends a slot machine game by providing an initial opportunity to form winning symbol combinations and then, if any winning combinations appear in the symbol matrix, providing one or more subsequent opportunities by removing and replacing the symbols comprising the winning combinations.

7 Claims, 7 Drawing Sheets

METHOD OF EXTENDING PLAY OF A SLOT MACHINE GAME

PRIORITY CLAIMS AND RELATED APPLICATIONS

This application is a continuation-in-part of U.S. application Ser. No. 10/438,325, filed May 15, 2003, which is a continuation-in-part of U.S. application Ser. No. 09/939,787, filed Aug. 28, 2001, now U.S. Pat. No. 6,960,133, which claims priority from U.S. Provisional Application No. 60/228,472, filed Aug. 28, 2000. This application is also a continuation-in-part of U.S. application Ser. No. 10/438,325, filed May 15, 2003, which is a continuation-in-part of U.S. application Ser. No. 10/105,942, filed Mar. 26, 2002, now U.S. Pat. No. 6,935,947, which is a continuation-in-part of U.S. application Ser. No. 09/432,602, filed Nov. 3, 1999, which is a continuation-in-part of U.S. application Ser. No. 09/234,098, filed Jan. 19, 1999, now U.S. Pat. No. 6,371,851, which is a continuation of International Application No. PCT/US98/10373, filed May 21, 1998, which in turn claims priority from U.S. Provisional Application No. 60/047,493, filed May 23, 1997. U.S. application Ser. No. 10/105,942 also claims priority from U.S. Provisional Application No. 60/289,633, filed on May 9, 2001. This application is a continuation-in-part of U.S. application Ser. No. 10/438,325, filed May 15, 2003, which is also a continuation-in-part of U.S. application Ser. No. 09/613,727, filed Jul. 11, 2000, now U.S. Pat. No. 6,604,998, which claims priority from U.S. Provisional Application No. 60/164,583, filed Nov. 10, 1999. This application also is a continuation-in-part of U.S. application Ser. No. 10/438,325, filed May 15, 2003, which claims priority from U.S. Provisional Application Nos. 60/380,485, filed May 15, 2002, 60/412,012, filed Sep. 20, 2002, and 60/445,769, filed Feb. 10, 2003. All of these applications are incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF THE INVENTION

In general, the present invention relates to an extended slot machine game. More specifically, the present invention extends a slot machine game by providing one or more opportunities to form winning symbol combinations.

BACKGROUND OF THE INVENTION

To play a conventional slot machine, the player deposits money into the machine, sets the wager, spins the reels, and collects awards for winning symbol combinations appearing on selected pay lines, according to a pay schedule. Since conventional slot machines are limited to the foregoing methods, players, casinos, and manufacturers suffer.

Players grow bored of playing games using same method of play; casinos suffer from player dissatisfaction with the casino's game selection; casinos cannot distinguish their games from other casinos; and game manufacturers cannot distinguish their products from other manufacturers.

New methods of playing slot machines, therefore, are required to provide players, casinos, and manufacturers with unique slot machine games, such as the present invention's methods to extend the slot machine game by providing one or more opportunities to form winning symbol combinations and collect awards.

SUMMARY OF THE INVENTION

The present invention extends a slot machine game by providing an initial opportunity to form winning symbol combinations and then, if any winning combinations appear in the symbol matrix, providing one or more subsequent opportunities by removing and replacing the symbols comprising the winning combinations.

In a preferred embodiment of the present invention (Keep Playin'), the player places a wager to participate in an extended slot machine game which includes an initial opportunity to form winning symbol combinations and subsequent opportunities to form winning symbol combinations, as follows:

The initial opportunity to form winning symbol combinations occurs following the appearance of symbols in the symbol positions of the symbol matrix. Each symbol position contains one symbol that is selected at random from the pool of symbols associated with that symbol position.

If no winning symbol combinations appear in the symbol matrix during the initial opportunity, the game ends. If one or more winning symbol combinations appear in the symbol matrix during the initial opportunity, the game provides a subsequent opportunity by removing and replacing all of the symbols comprising the winning symbol combinations.

All symbols comprising the winning symbol combinations are removed simultaneously from the symbol matrix. The remaining symbols re-adjust within each column to fill-in any gaps between symbols. Replacement symbols then appear in each vacant symbol position, with each symbol randomly selected from the pool of symbols associated with that symbol position.

The game extends from opportunity to opportunity to form winning symbol combinations until no winning symbol combinations appear in the symbol matrix. The value of each removed winning symbol combination is calculated according to a pre-determined payout schedule. At the end of the game, the cumulative total of awards issue to the player.

BRIEF DESCRIPTION OF THE DRAWINGS

The accompanying figures illustrate various stages of the preferred Keep Playin' embodiment of the present invention.

DESCRIPTION OF A PREFERRED EMBODIMENT

To play the Keep Playin' embodiment, the player initializes credits, sets the wager, spins the reels, and collects awards for wining symbol combinations formed during the initial and subsequent opportunities to form winning symbol combinations, as detailed below with reference to FIGS. 1 to 7.

Figure 1:
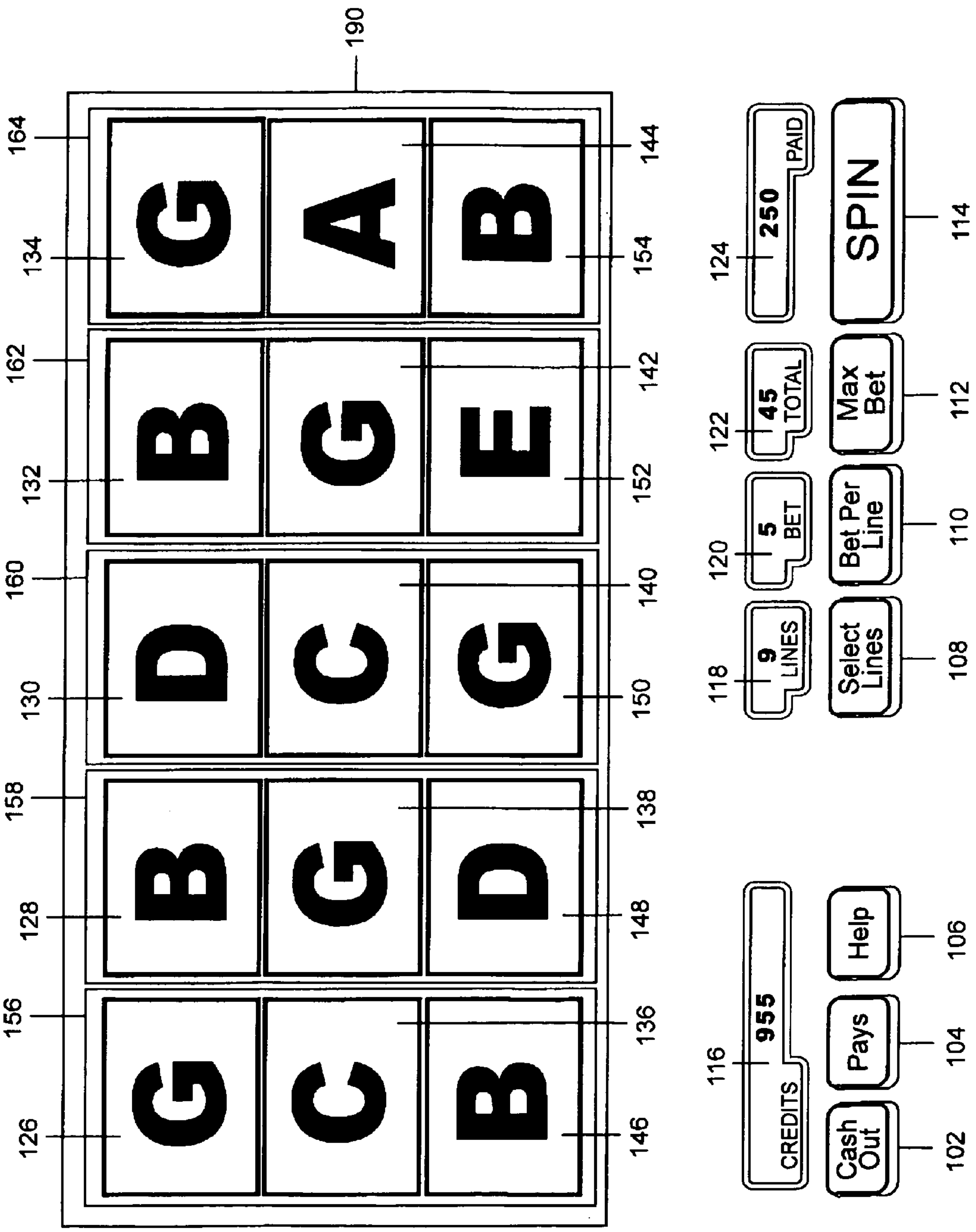
FIG. 1 shows a game screen with a winning symbol combination in the symbol matrix during the initial opportunity to form winning symbol combinations.

Initialize Credits. In FIG. 1, the player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, or other form of electronic funds transfer.

Set the Wager. In FIG. 1, the player sets the wager by selecting pay lines and setting the bet per pay line. The wager is calculated by multiplying the number of selected pay lines by the bet per pay line. For example, the player may wager five credits on each of nine pay lines for a total bet of forty-five credits. The total bet amount is displayed on the Total Bet meter 122.

To select pay lines, the player uses the Select Pay Lines button 108 and views the number of selected pay lines on the Select Pay Lines meter 118. The player uses the Select Pay Lines button to select pay lines in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, up to five credits may be wagered on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels. In FIG. 1, the player uses the Spin button 114 to randomly rearrange the symbols displayed in the symbol matrix 190. The symbol matrix 190 contains three symbol positions in each of the five columns 156-164 for a total of fifteen symbol positions 126-154. Each symbol position 126-154 is associated with a reel strip. Alternatively, any number of reel strips may be used to display symbols in symbol positions 126-154 of the symbol matrix 190.

The reel strips associated with each of the fifteen symbol positions 126-154 spin and randomly stop one at-a-time until all of the symbol positions 126-154 have stopped and revealed a symbol. Alternatively, any size symbol matrix may be used and any method may be used to rearrange symbols in the symbol matrix.

Winning Symbol Combinations. Winning symbol combinations are formed by two or more, same, adjacent symbols, starting from the leftmost position of a pay line. A predetermined pay schedule lists the award for each winning symbol combination. Any number of winning symbol combinations may be defined, with any amount assigned to each award. For example, the pay schedule may define four "A" symbols as a winning symbol combination with an award of 10× the bet per line. The player may view the pay schedule by using the Pays button 104.

Initial & Subsequent Opportunities to Form Winning Symbol Combinations. FIGS. 1 to 7 illustrate winning symbol combinations formed during the initial and subsequent opportunities to form winning symbol combinations in symbol matrix 190:

In FIG. 1, a winning G-G-G-G-G symbol combination at 126, 138, 150, 142, 134 forms on a payline in the symbol matrix 190 and generates a 250 credit award according to a predetermined pay schedule (not shown) as shown on the Paid meter at 124.

Figure 2:
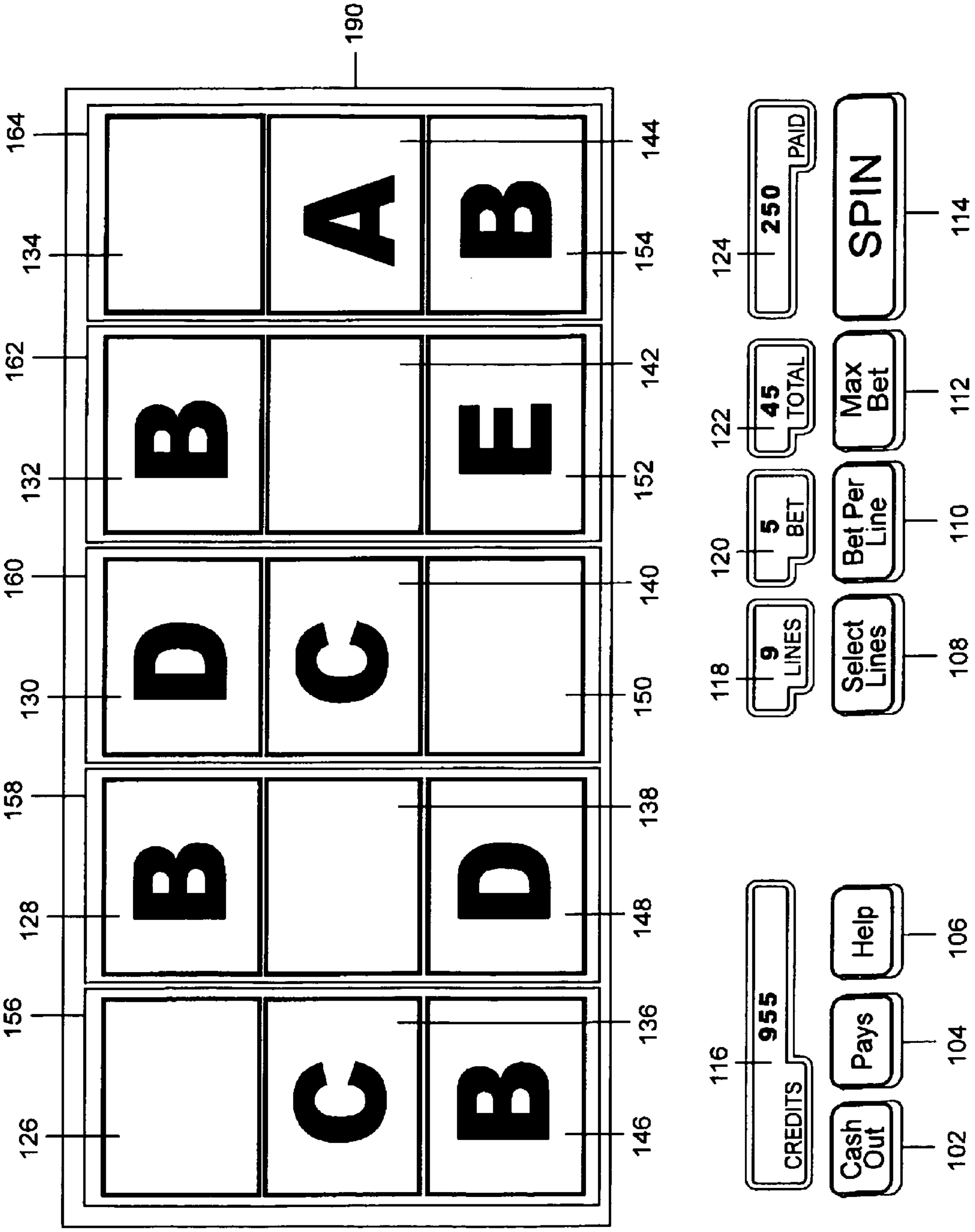
FIG. 2 shows a game screen with all symbols comprising the winning symbol combinations removed from the symbol matrix.

In FIG. 2, the G symbols comprising the winning G-G-G-G-G combination at 126, 138, 150, 142, 134 are removed from the symbol matrix 190. All of the symbols in the winning symbol combination are removed at the same time.

Figure 3:
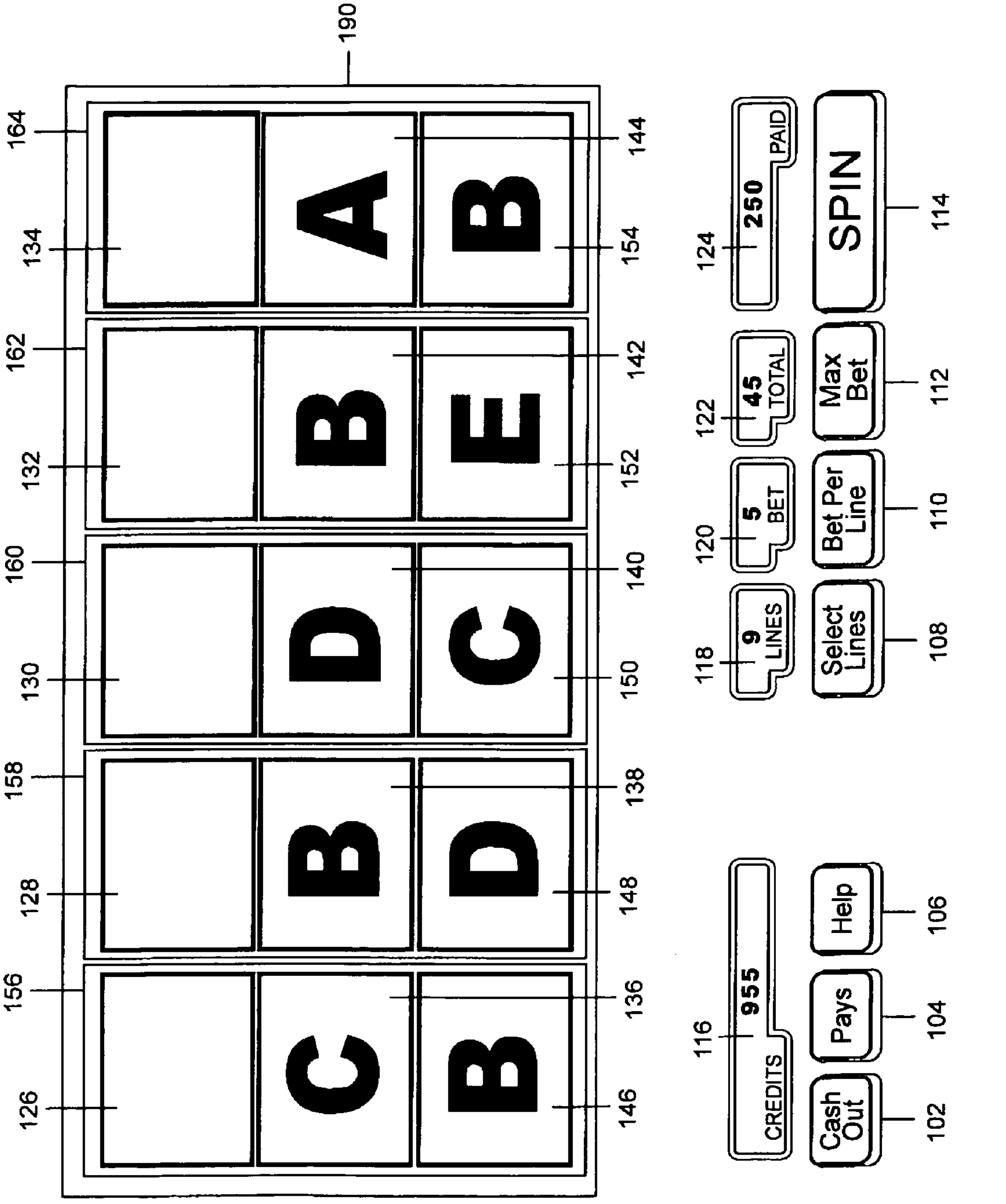
FIG. 3 shows a game screen with the remaining symbols re-adjusted within the symbol matrix to fill-in any vertical gaps between symbols.

In FIG. 3, the symbols in the columns readjust to eliminate the gaps by dropping to the lowest available position in each respective column. All of the symbols readjust in the symbol matrix 190 at the same time, as follows:

In the second column 158 from the left of the symbol matrix 190, the B symbol in the top symbol position 128 drops into the middle symbol position 138;

In the third column 160 from the left of the symbol matrix 190, the D and C symbols in the top and middle symbol positions 130, 140 drop into the middle and bottom symbol positions 140, 150; and In the fourth column 162 from the left of the symbol matrix 190, the B symbol in the top symbol position 132 drops into the middle position 142.

Figure 4:
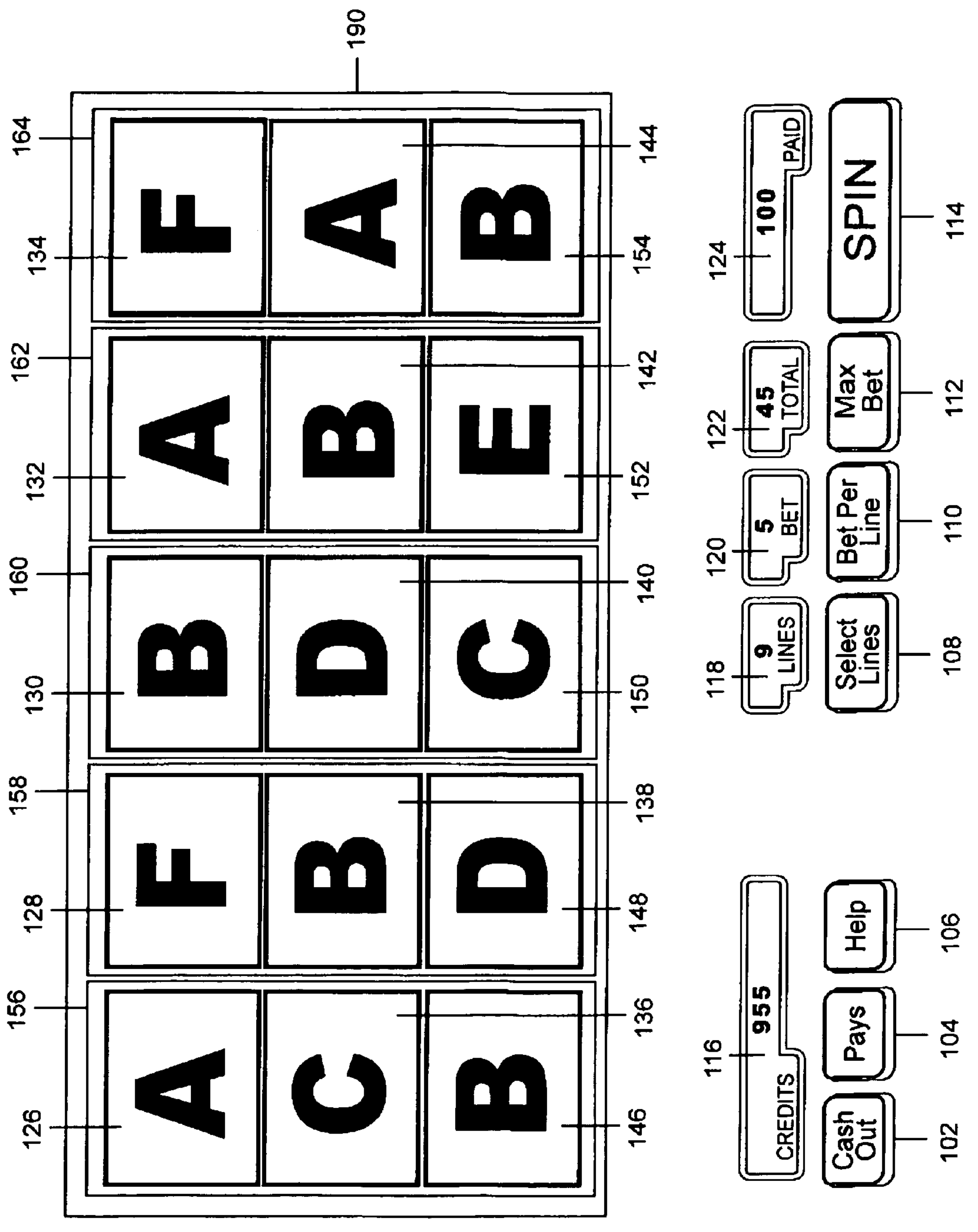
FIG. 4 shows a game screen with replacement symbols appearing in all vacant symbol positions of the symbol matrix to provide a second opportunity to form winning symbol combinations.

In FIG. 4, replacement symbols appear in each vacant symbol position of the respective columns. All of the replacement symbols appear in the symbol matrix 190 at the same time, with each symbol selected from the reel strip associated with that symbol position, as follows:

In the first column 156 from the left of the symbol matrix 190, an A symbol appears in the top symbol position 126;

In the second column 158 from the left of the symbol matrix 190, an F symbol appears in the top symbol position 128;

In the third column 160 from the left of the symbol matrix 190, a B symbol appears in the top symbol position 130;

In the fourth column 162 from the left of the symbol matrix 190, an A symbol appears in the top symbol position 132; and In the fifth column 164 from the left of the symbol matrix 190, an F symbol appears in the top symbol position 134.

The replacement symbols provide an additional opportunity to form a winning symbol opportunity. FIG. 4 shows the replacement symbols forming a winning B-B-B-B-B combination at 146, 138, 130, 142, 154, and generating a 100 credit award according to a predetermined pay schedule (not shown), bringing the total award to 350, as shown on the Paid meter at 124.

Figure 5:
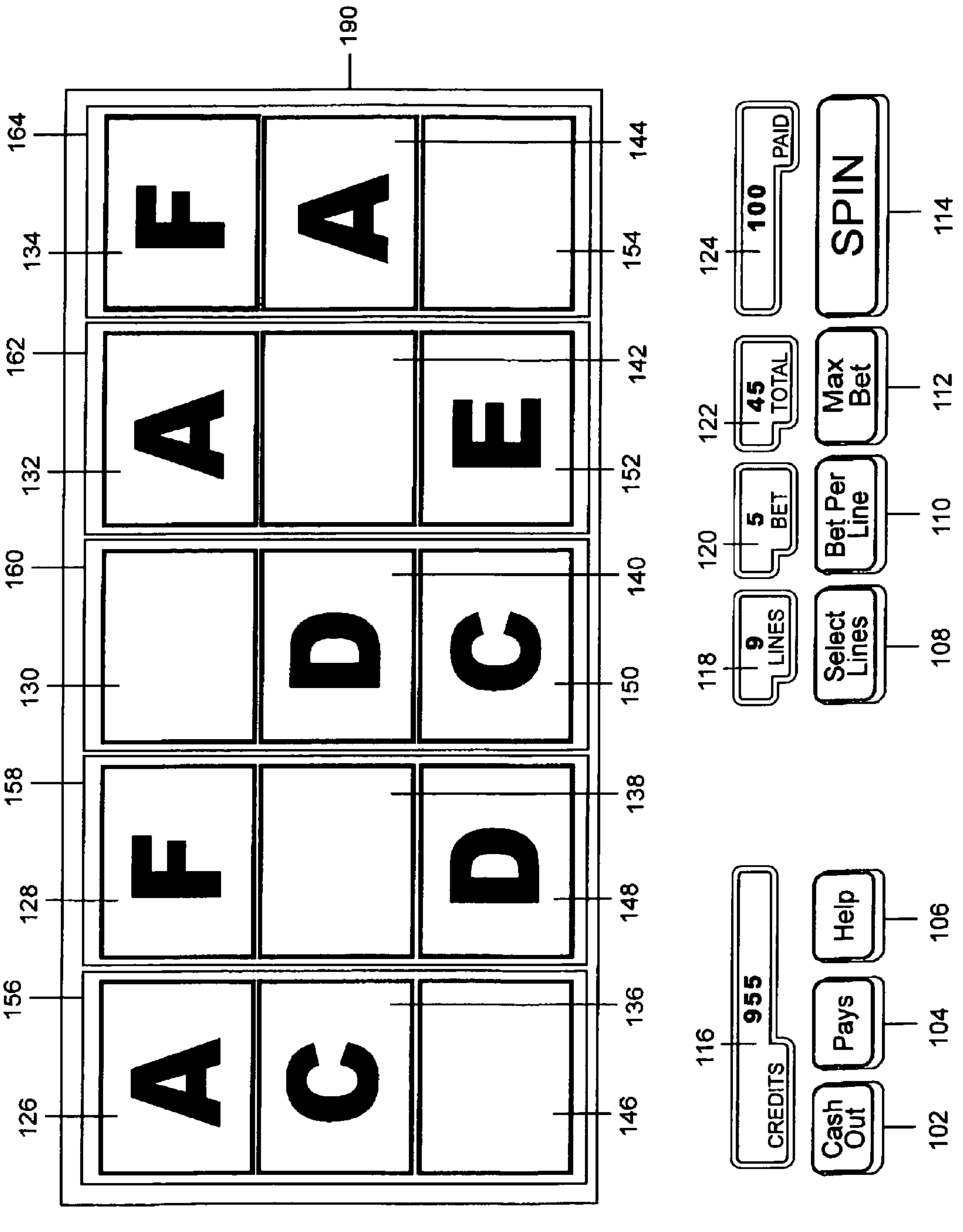
FIG. 5 shows a game screen with all symbols comprising the winning symbol combinations removed from the symbol matrix.

In FIG. 5, the B symbols comprising the winning B-B-B-B-B combination at 146, 138, 130, 142, 154 are removed from the symbol matrix 190. All of the symbols in the winning symbol combination are removed at the same time.

Figure 6:
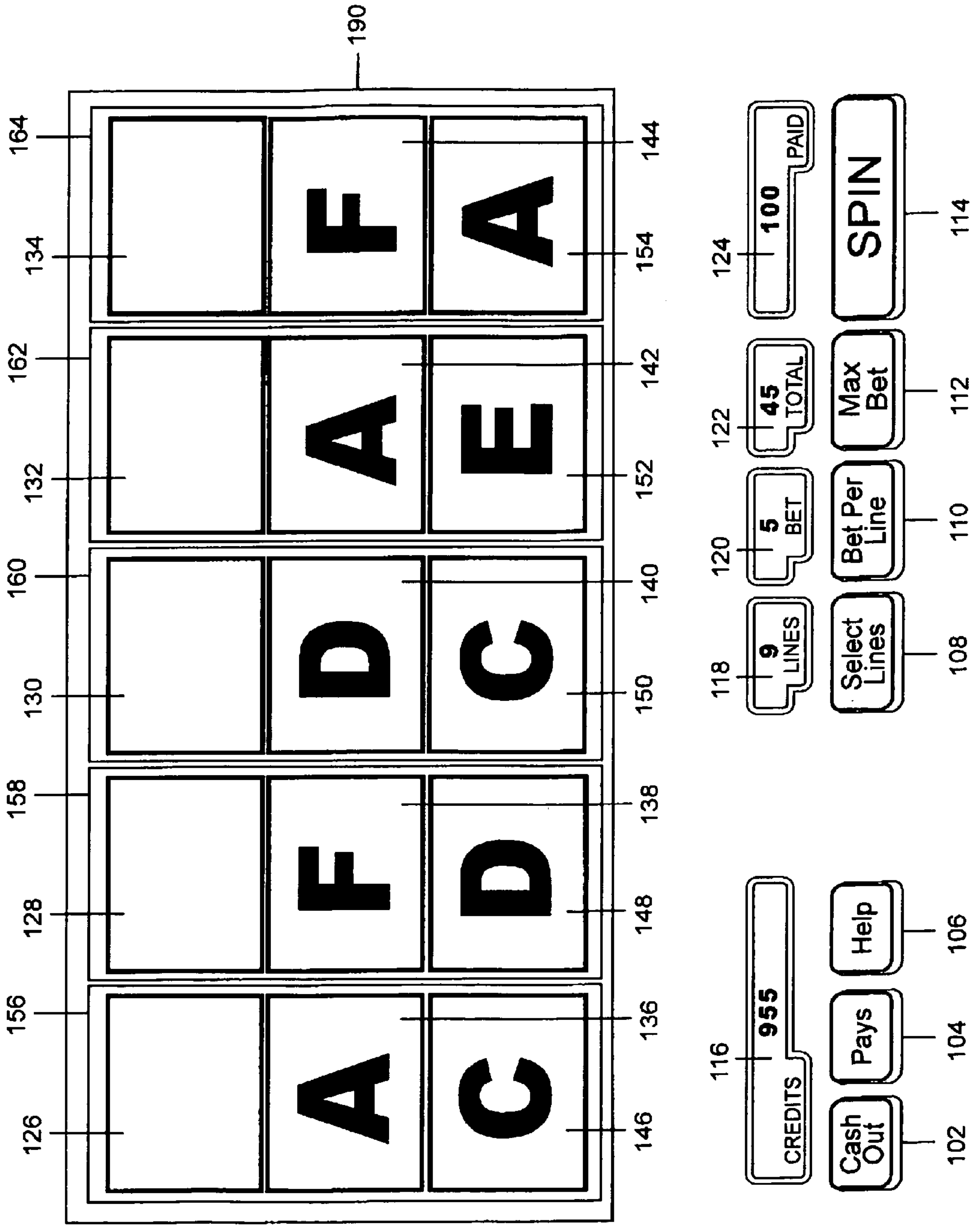
FIG. 6 shows a game screen with the remaining symbols re-adjusted within the symbol matrix to fill-in any vertical gaps between symbols.

In FIG. 6, the symbols in the columns readjust to eliminate the gaps by dropping to the lowest available position in each respective column. All of the symbols readjust in the symbol matrix 190 at the same time, as follows:

In the first column 156 from the left of the symbol matrix 190, the A and C symbols in the top and middle symbol positions 126, 136 drop into the middle and bottom symbol positions 136, 146;

In the second column 158 from the left of the symbol matrix 190, the F symbol in the top symbol position 128 drops into the middle symbol position 138;

In the fourth column 162 from the left of the symbol matrix 190, the A symbol in the top symbol position 132 drops into the middle position 142; and In the fifth column 164 from the left of the symbol matrix 190, the F and A symbols in the top and middle symbol positions 134, 144 drop into the middle and bottom symbol positions 144, 154.

Figure 7:
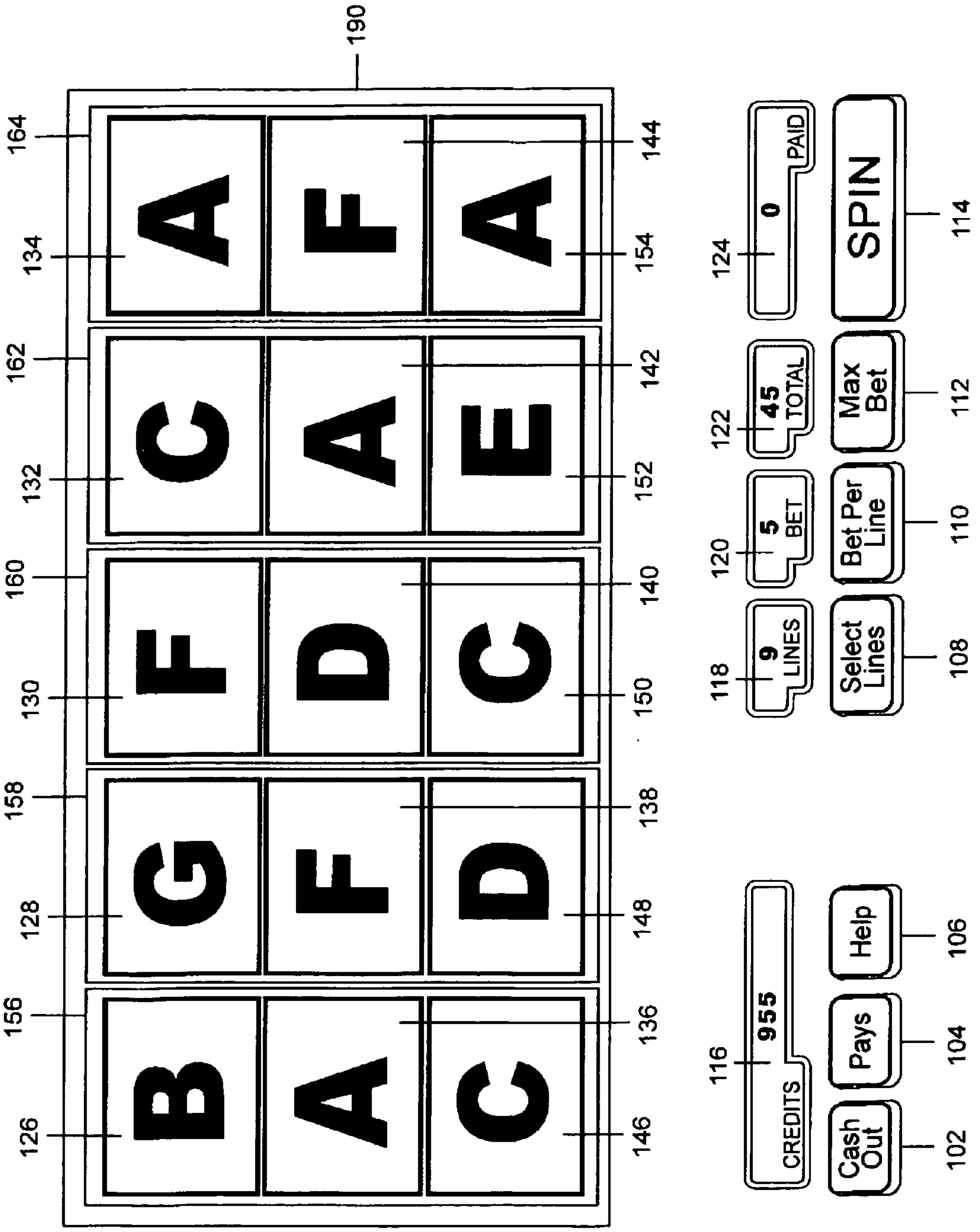
FIG. 7 shows a game screen with replacement symbols appearing in all vacant symbol positions of the symbol matrix to provide a third opportunity to form winning symbol combinations.

In FIG. 7, replacement symbols appear in each vacant symbol position of the respective columns. All of the replacement symbols appear in the symbol matrix 190 at the same time, with each symbol selected from the reel strip associated with that symbol position, as follows:

In the first column 156 from the left of the symbol matrix 190, an B symbol appears in the top symbol position 126;

In the second column 158 from the left of the symbol matrix 190, an G symbol appears in the top symbol position 128;

In the third column 160 from the left of the symbol matrix 190, a F symbol appears in the top symbol position 130;

In the fourth column 162 from the left of the symbol matrix 190, an C symbol appears in the top symbol position 132; and In the fifth column 164 from the left of the symbol matrix 190, an A symbol appears in the top symbol position 134.

The replacement symbols provide another opportunity to form a winning symbol opportunity. FIG. 7, however, shows the replacement symbols do not form any additional winning symbol combinations, the 350 credits awarded during the game issue to the player, and the game ends.

At the conclusion of each game, all credits awarded are added to the player's balance of credits. As long as the player has credits on the Credit meter 116, the player may continue to play the game or the player may also collect the balance of credits by pressing the Cash Out button 102. In addition, the player may press the Help button 106 to view the rules of the game.

DESCRIPTION OF ALTERNATIVE EMBODIMENTS

In addition to the preferred embodiment, as described above, the present invention may be modified in one or more aspects, including but not limited to the following alternative embodiments:

In one embodiment, the present invention uses any size of symbol matrix using any number of symbol positions. For example, a symbol matrix may use 4 rows and 6 columns with 24 symbol positions.

In another embodiment, the present invention may use any number of reel strips to display symbols in the symbol matrix. For example, one reel strip may be used to generate symbols in all symbol positions in each column of the symbol matrix.

In another embodiment, the present invention uses any number of pay lines. For example, a symbol matrix with 30 pay lines defined across the symbol matrix. Further, pay lines may be defined in any manner to include any of the symbol positions in the symbol matrix.

In another embodiment, the present invention uses any method for defining winning symbol combinations in addition to or alternative to the traditional payline methods. For example, all adjacent, same symbols in the symbol matrix form winning symbol combinations.

In another embodiment, the present invention may offer any number of opportunities to form winning symbol combinations. For example, opportunities may be limited to an overall number, number of specific winning symbol combinations, and/or number of credits awarded.

In another embodiment, the present invention may remove and replace any number of the symbols comprising the winning symbol combinations. For example, only symbols comprising the winning symbol combination with the highest award value are removed and replaced.

In another embodiment, the present invention may remove and replace any number of symbols which are not part of a winning symbol combination. For example, all symbols of the same type used to form a winning symbol combination are removed and replaced.

In another embodiment, the present invention may retain any symbol in a winning symbol combination in the symbol matrix. For example, wildcard symbols that help form winning symbol combinations are retained in the symbol matrix In another embodiment, the present invention may remove symbols in any manner. For example, symbols comprising winning symbol combinations may be removed in order of the value of the combinations.

In another embodiment, the present invention may readjust symbols in any manner. For example, symbols remaining in the symbol matrix may be rearranged by moving all symbols upwards in each column that has any gaps between remaining symbols.

In another embodiment, the present invention may readjust symbols after removal of any symbols. For example, symbols may readjust after the removal of each symbol.

In another embodiment, the present invention may not readjust some symbols. For example, all symbols remaining in the symbol matrix do not move to fill in any gaps between symbols in the symbol matrix.

In another embodiment, the present invention may replace symbols in any manner. For example, vacant symbol positions may be filled from the top symbol position of a column to the bottom position, starting with the leftmost column and proceeding across the symbol matrix.

In another embodiment, the present invention replaces symbols using any method. For example, the vacant symbol positions may be filled with replacement symbols using difference reel strips than those used to generate the initial symbols.

In another embodiment, the present invention may calculate awards for winning symbol combinations at any time. For example, the awards for winning symbol combinations may be calculated after the removal and replacement of each individual symbol.

In another embodiment, the present invention may change award values for winning symbol combinations. For example, the award values may increase with each successive opportunity to form winning symbol combinations.

In another embodiment, the present invention may issue any type of award. For example, awards during the first opportunity are credits, the second opportunity awards are free spins, and all subsequent opportunities awards are prizes.

In another embodiment, the present invention only occurs with placement of an additional or side-bet wager. For example, an additional wager of 10 credits activates the ability to remove and replace symbols.

In another embodiment, any event may trigger the present invention, including symbol combinations, wager type or amount, win or loss frequencies or amounts, and/or at random. For example, the removal and replacement of winning symbol combinations may occur at random.

In another embodiment, the present invention may be a primary base game feature. In another embodiment, the present invention may be a secondary bonus game feature.

SCOPE & SPIRT OF THE PRESENT INVENTION

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of operating an electronic gaming device via a processor comprising:

a. the processor operable to accept a wager to activate a game;

b. the processor operable to randomly rearrange a plurality of symbols;

c. the processor operable to displaying said rearranged symbols in a plurality of symbol positions such that one symbol appears in each symbol position;

d. the processor operable to calculate awards for any displayed winning symbol combinations;

e. the processor to remove any symbols that comprise said winning symbol combinations to create vacant symbol positions;

f. the processor operable to randomly generate and display replacement symbols in said vacant symbol positions;

g. the processor operable to calculate awards for any displayed winning symbol combinations;

h. the processor operable to repeat steps e) through g) until a predetermined termination event occurs; and i. the processor operable to issue a total award based on a cumulative value of the awards calculated during the game.

2. A method of claim 1 in which all symbols comprising winning symbol combinations are removed at the same time.

3. A method of claim 1 in which all replacement symbols are generated and displayed at the same time.

4. A method of claim 1 in which awards for winning symbol combinations are calculated according to a same pay schedule throughout the game.

5. A method of claim 1 in which awards for winning symbol combinations are calculated according to a separate pay schedule associated with each stage of the game.

6. A method of claim 1 in which the predetermined termination event is the absence of any winning symbol combinations.

7. A method of operating an electronic gaming device via a processor comprising:

a. the processor operable to accept a wager to activate a game;

b. the processor operable to randomly rearrange a plurality of symbols;

c. the processor operable to display the rearranged symbols in a plurality of symbol positions wherein one symbol is displayed in each symbol position;

d. the processor operable to calculate awards for any displayed winning symbol combinations;

e. removing all symbols comprising winning symbol combinations at the same time;

f. randomly generating and then displaying replacement symbols in the vacant symbol positions at the same time;

g. calculating awards for winning combinations of symbols according to a pay schedule with award value enhancements based upon the number of repetitions of steps e) through g);

h. repeating steps e) through g) until no winning symbol combinations appear; and i. issuing the cumulative value of all awards calculated during the game.

* * * * *